2,914,474
REMOVAL OF FLUORIDES FROM INDUSTRIAL WASTE WATERS

John C. Hillyer and Joseph F. Wilson, Bartlesville, Okla., assignors to Phillips Petroleum Company, a corporation of Delaware No Drawing. Application July 29, 1954
Serial No. 446,662

7 Claims. (Cl. 210—53)

This invention relates to a process for removal of combined fluorides from water in which at least a portion of the fluoride is present as the fluosilicate ion. A specific aspect of the invention pertains to the removal of fluoride from industrial waste waters containing the same.

In various industrial processes waste waters contain fluoride in combined form. One example is in the waste water from a triple super phosphate plant which produces this material from apatite, $Ca_4(CaF)(PO_4)_3$. The fluoride is removed from plant fumes by water-washing and, of course, it is desirable to remove the fluoride from the waste water before dumping the same into rivers, lakes, and tide water. In this particular instance, approximately 75% of the fluoride is present in the fluosilicate ion, the remaining portion being in the form of HF.

The objects of the invention comprise to provide process for removal of fluoride from aqueous solutions containing same in combined form in which at least a portion of the fluoride is in the form of the fluosilicate ion; to provide a simple and economical process for removing fluoride from industrial waste waters; and to provide an improved process for removing fluoride from sea water-containing solutions of fluoride compounds in which at least part of the fluoride is in the form of the fluosilicate ion. Other objects of the invention will become apparent from a consideration of the accompanying disclosure.

It is now discovered that soluble fluorides can be economically removed from waste waters by neutralizing the waste to a pH of at least 5.0, preferably above 6.0, and precipitating the fluorine as calcium fluoride. The process is novel in that the effluent waste water is neutralized with finely divided calcium carbonate in the presence of an excess of calcium ions supplied by calcium sulfate so as to precipitate the fluorine present as calcium fluoride. Waste waters treated in this manner are reduced to at least 20 and as low as 8 parts per million fluorine. Reduction of fluorine content of waste waters of this type below 8 parts per million fluorine is impractical, since the slight solubility of calcium fluoride at normal atmospheric temperatures will cause about 8 parts per million of fluorine to be dissolved.

This invention is based on the discovery that at a pH of at least 5.0, the fluosilicate ion decomposes to form the fluoride ion, which can be precipitated readily as calcium fluoride. Most fluosilicates are quite soluble and the removal of fluorine in this form involves their conversion to one of the very few insoluble forms such as for example, barium fluosilicate. Such a procedure is seriously limiting, involving the use of expensive materials often not readily available and producing byproducts for which there is little demand in the chemical industries.

It is preferred to effect a neutralization to a pH of at least 5.0 with finely divided calcium carbonate such as limestone or oyster shells, but lime, caustic alkalis, or other suitable base may be used to effect this neutralization. It is feasible to raise the pH to 10, and even higher, by the use of the stronger bases, alone, or in addition to the weaker basic materials. As exemplary, both sodium hydroxide and calcium carbonate may be added to the solution to be treated and the pH may be raised to the level of about 13.5 but it is uneconomical to do so. The pH of waste waters containing intolerable amounts of fluorine is below 3 and generally below 2. Calcium ions are supplied to this solution by the addition of a slurry of calcium sulfate (gypsum). It is to be noted that the process is not dependent upon the order of addition of the reagents, as the excess calcium ions may be supplied to the waste being treated before the neutralizing agent is added.

It has also been discovered that the precipitation of the fluorine as calcium fluoride cannot be brought about by the addition of calcium sulfate (gypsum) alone. The fluorine present as hydrofluoric acid can be precipitated as calcium fluoride by this method, but the majority of the fluorine is usually found to be present as fluosilicic acid, upon which the calcium sulfate alone has little effect.

The neutralization is most effectively carried out by using calcium carbonate ground to at least an 80 mesh fineness, preferably 100 mesh. Further grinding of the calcium carbonate brings about only a very slight additional neutralizing effect. The effect of temperature on the neutralization process is negligible in the preferred range of 70°–200° F. Higher temperatures should not be used, since these temperatures would approach the boiling point of the solution.

The preferred amount of calcium carbonate to be used for neutralization and pH control is 1–5 times the theoretical amount of calcium carbonate necessary for precipitation of the fluorine content of the fluosilicic acid and/or hydrofluoric acid present in the stream to be treated, as calcium fluoride.

Substantial reduction in fluorine content is realized in about 10 to 20 minutes and, if flocculation and decantation were to be done at this point quite effective removal would be made and fluorine content should be reduced to about 20 parts per million. However in many instances, and particularly where the effluent is discharged into settling tanks or ponds, a longer time, say about three to four hours will be desirable to permit settling of calcium fluoride before the aqueous waste is discharged into public streams or lakes.

It is also discovered that this process is particularly adapted to precipitating fluorine from waste waters when the calcium sulfate that is used to supply the excess calcium ions is slurried with sea water or with mixtures of sea water and fresh water. The process can also be used when the calcium sulfate is slurried with 100 percent fresh water, in which case slightly more calcium carbonate is required for neutralization than when sea water or sea water-fresh water mixtures are used. Similarly, the process is particularly adaptable to removing fluorine from waste waters consisting of solutions of fluosilicic and hydrofluoric acids in sea water or sea water-fresh water mixtures. The amount of calcium carbonate required for neutralization decreases with increasing concentration of sea water.

The following illustrative examples are presented to more clearly illustrate the invention and are not to be construed as imposing unnecessary limitations thereon.

Example I

A typical waste water containing fluorine compounds was prepared and purified by the following procedure, assuming 75 percent of the fluorine present to be in the form of fluosilicic acid. Sixty-nine milliliters of 0.751 percent fluosilicic acid was mixed with 23 milliliters of 0.626 percent hydrofluoric acid. This solution was then diluted with one-half normal sea water until the fluorine content of the solutiion was 3800 parts per million. The one-half normal sea water used was a 50–50 mixture of fresh water and normal sea water. The sea water used was a brine solution made up to correspond to typical sea water analyses. To this solution was added 67 grams of calcium sulfate slurry consisting of 33 percent by weight calcium sulfate with two waters of hydration in ½ N sea water. Several batches of the acid slurry mixture were made up by this procedure, and varying weights of 100 mesh oyster shell (99 percent calcium carbonate) were added to each of the acid-slurry batches. The various mixtures were heated to 120° F. and allowed to stand for 3 hours before fluorine analyses were made. The results of these tests are tabulated below. Note: The shell equivalents as tabulated below are the number of calcium carbonate equivalents used if one equivalent is the amount of calcium carbonate theoretically required to effect neutralization.

| Grams Shell Added | Shell Equivalents | pH of Solution After Settling | p.p.m. Fluorine Remaining in Soln. |
|---|---|---|---|
| 1.08 | 1.5 | 2.8 | 1620 |
| 1.44 | 2.0 | 3.1 | 420 |
| 2.15 | 3.0 | 6.1 | 10 |

Several batches of a more dilute acid-slurry mixture were made up by mixing 87 milliliters of 0.148 percent fluosilicic acid and 29 milliliters of 0.123 percent hydrofluoric acid, diluting to 1080 parts per million fluorine with ½ N sea water, and adding 17 grams of 33 percent calcium sulfate (and 2 waters of hydration) slurry. Various weights of 100 mesh oyster shell were added to each batch as outlined previously. The results are tabulated below.

| Grams Shell Added | Shell Equivalents | pH of Solution After Settling | p.p.m. Fluorine Remaining in Soln. |
|---|---|---|---|
| 0.268 | 1.5 | 2.8 | 490 |
| 0.536 | 3.0 | 3.4 | 35 |
| 0.713 | 4.0 | 5.7 | 9 |

The preceding example has shown that the pH of the final solution is indicative of the fluorine content, therefore the results in the following examples are expressed in pH alone.

*Example II*

A typical waste water containing fluorine was made up with 93 milliliters of 0.148 percent fluosilicic acid in ½ N sea water to yield a solution containing 1080 parts per million fluorine. To this was added one gram of ¼"–⅜" diameter oyster shells (99 percent calcium carbonate) which had been previously washed and dried. Calcium sulfate slurry was not used in these runs, so that the effect of oyster shells on pH of the solution could be determined. The pH variation with time was checked for a mixture of this type at temperatures of 78° F., 104° F., and 140° F. The results are tabulated below.

| Time (Minutes) | pH of 78° F. Soln. | pH of 104° F. Soln. | pH of 140° F. Soln. |
|---|---|---|---|
| 0 | 1.9 | 2.0 | 2.2 |
| 10 | 3.8 | 2.8 | 2.9 |
| 20 | 4.1 | 3.1 | 3.2 |
| 30 | 3.9 | 3.4 | 3.3 |
| 40 | 3.6 | 3.5 | 3.5 |
| 180 | 3.6 | 3.5 | 3.5 |

It was noted in these runs that a gelatinous precipitate formed on the calcium carbonate, effectively blocking further formation of calcium ions by rendering the calcium carbonate very insoluble. As a check of what the pH should have preceded to had not the gelatinous precipitate formed, a solution of one gram of oyster shells in ½ N sea water was made up, and the pH rose quickly to a rather constant value of 9.0.

*Example III*

A run was made using powdered commercial oyster shells to determine if size of the oyster shell had an effect on the neutralization of the acids in the waste water. Calcium sulfate (gypsum) slurry was not used in this run. A sample of commercially ground shell weighing 2.79 grams was screened and sized. The analysis is tabulated below.

| | | |
|---|---|---|
| 60–100 mesh | 1.69 grams | 61 percent by weight. |
| 100–120 mesh | .09 grams | 3 percent. |
| 120–200 mesh | .48 grams | 16 percent. |
| 200+ | .51 | 18 percent. |
| | | 98 percent. |

2 percent loss during screening.

Several batches of solution containing 3800 parts per million fluorine were made up by adding 34.5 milliliters of 0.75 percent fluosilicic acid and 11.5 milliliters of 0.626 percent hydrofluoric acid to 29 milliliters of ½ N sea water. Various weights of commercially ground oyster shells were added to these batches of solution, and the variation of pH of the solution with time was checked. The various mixtures were heated to 120° F. and allowed to settle and cool, with the pH being checked at various time intervals. The results are tabulated below.

| Time (Minutes) | pH of Soln. (1.1 Equivalents Shell Added) | pH (3.0 Equiv. Shell Added) | pH (5.0 Equiv. Shell Added) |
|---|---|---|---|
| 0 | 1.35 | 1.35 | 1.35 |
| 1 | 1.75 | 2.70 | 3.95 |
| 2 | 1.75 | 2.8 | 4.30 |
| 4 | 1.70 | 3.05 | 5.0 |
| 6 | 1.70 | 3.3 | 5.85 |
| 10 | 1.70 | 4.15 | 6.55 |
| 14 | 1.70 | 5.25 | 6.85 |
| 180 | 2.0 | 7.0 | 7.3 |

*Example IV*

Two hundred thirty-five gallons per minute is diverted from a 600 gallon per minute effluent waste stream from an industrial plant containing 3800 parts per million fluorine and used to slurry calcium sulfate solid wastes from the plant. The 600 gallon per minute waste stream is a solution of fluosilicic acid and hydrofluoric acid in ½ normal sea water (50 percent fresh water—50 percent sea water). The acids are present in the ratio of 3 parts fluosilicic acid to 1 part hydrofluoric acid. The slurry stream and the untreated waste acid stream are recombined, and oyster shells, ground to at least 80 mesh fineness and consisting of 99 percent calcium carbonate, are added to this waste stream in a quantity to supply at least three times the amount of calcium carbonate required theoretically to precipitate all the fluorine present as calcium fluoride. The stream is then emptied into a waste settling basin and allowed to settle without agitation and cool from its effluent temperature of 120° F. After at least 3 hours settling, the clear solution remaining is decanted and disposed of by allowing it to flow into the plant waste disposal system (bay, ocean, river, etc.). The solution being disposed of is analyzed and found to have a pH of at least 5.0 and a fluorine content of not higher than 20 parts per million.

Certain modifications of the invention will become apparent to those skilled in the art and the illustrative details disclosed are not to be construed as imposing unnecessary limitations on the invention.

We claim:
1. A process for treating an aqueous solution having a pH of less than 3 containing combined fluorine, a substantial portion of which is in the form of fluosilicic acid, which comprises raising the pH of same to at least 5 by adding calcium carbonate thereto and adding sufficient calcium sulfate to provide calcium ions in excess of the fluorine in said solution so as to precipitate fluorine as calcium fluoride and reduce the fluorine content to a maximum of 20 p.p.m.

2. The process of claim 1 wherein sea water is admixed with said solution prior to precipitation with calcium sulfate.

3. The process of claim 1 wherein calcium sulfate is slurried with sea water and said slurry is admixed with said solution.

4. The process of claim 1 wherein the calcium carbonate is of a fineness of at least 80 mesh.

5. The process of claim 1 wherein the temperature of the solution is in the range of 70° to 200° F.

6. The process of claim 1 wherein the pH is raised to at least 6.

7. The process of claim 1 wherein said solution contains hydrofluoric acid in addition to fluosilicic acid.

References Cited in the file of this patent

UNITED STATES PATENTS

| | | |
|---|---|---|
| 2,126,793 | MacIntire | Aug. 16, 1938 |
| 2,257,111 | Elvove | Sept. 30, 1941 |
| 2,371,759 | King et al. | Mar. 20, 1945 |
| 2,376,897 | Behrman et al. | May 29, 1945 |
| 2,442,584 | Calmon | June 1, 1948 |

FOREIGN PATENTS

| | | |
|---|---|---|
| 4,954 | Great Britain | Oct. 17, 1883 |
| 261,708 | Great Britain | Apr. 7, 1927 |

OTHER REFERENCES

Partington: Text-book of Inorganic Chem., 6th ed., The MacMillan Co. of Canada, Ltd., Toronto, Canada, 1950, pages 667 and 668.